Dec. 8, 1953     J. LE VALLEY     2,661,893
CONTROL DEVICE FOR FLUID COMPRESSORS
Filed Aug. 10, 1950
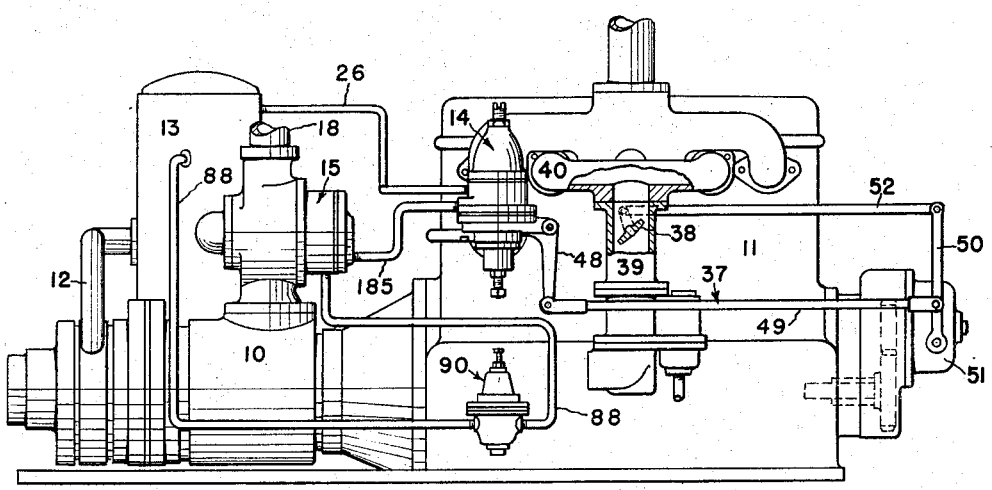
FIG-1
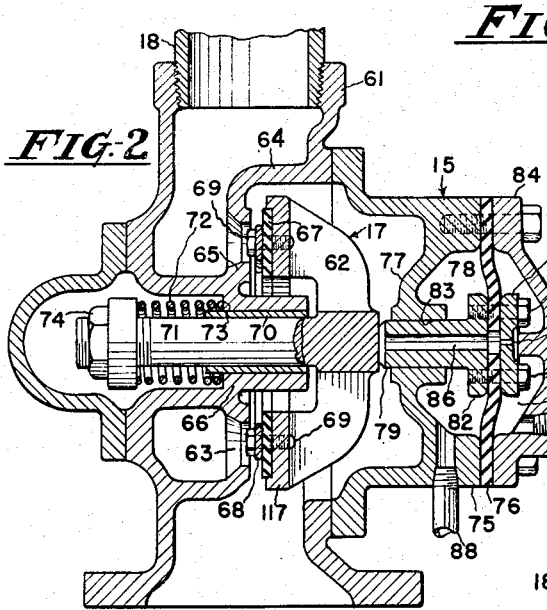
FIG-2
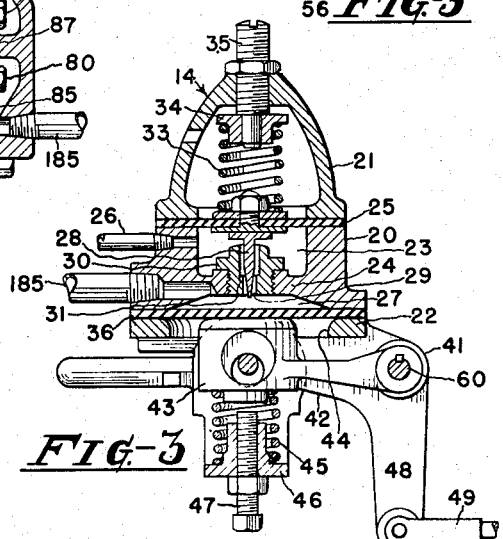
FIG-5
FIG-3
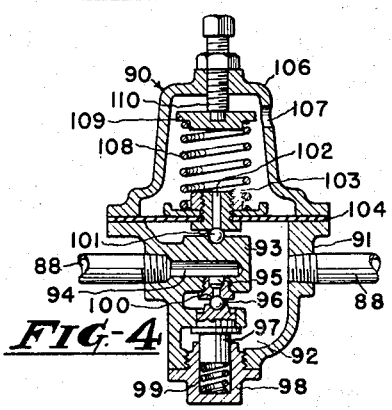
FIG-4
INVENTOR
JOHN LE VALLEY
BY
HIS ATTORNEY Patented Dec. 8, 1953

2,661,893

UNITED STATES PATENT OFFICE 2,661,893

CONTROL DEVICE FOR FLUID COMPRESSORS

John Le Valley, Painted Post, N. Y., assignor to Ingersoll-Rand Company, New York, N. Y., a corporation of New Jersey Application August 10, 1950, Serial No. 178,619

6 Claims. (Cl. 230—3)

This invention relates to a control device for fluid compressors, and more particularly to a device for controlling the output of the compressor in accordance with variations in discharge pressure of the compressor.

One object of this invention is to control the output of the compressor in accordance with variations in discharge pressure of the compressor by regulating both the speed of the compressor driving motor and the flow of pressure fluid through the compressor.

Another object of the invention is to provide a simple device to control the output of the compressor by varying the speed of the compressor over a portion of the compressor load range and by simultaneously varying the compressor speed and controlling the rate of flow of gas into the compressor over the remainder of the load range.

Further objects of the invention will become obvious from the following specification and accompanying drawings in which Figure 1 is a side view of a motor-compressor unit to which is adapted a preferred form of the load control device, Fig. 2 is a sectional elevation of the compressor intake control valve and the associated actuating mechanism, Fig. 3 is a view, partly in section, of a regulator for controlling the speed of the compressor driving motor, Fig. 4 is a sectional view of a pressure reducing valve, Fig. 5 is a longitudinal elevation, partly in section, of a speed governor.

Referring to the drawings and more particularly to Figure 1, 10 indicates a compressor driven by a motor 11 of the internal combustion type. The compressor illustrated is of the rotary vane type and serves to compress air, or other gas, which is discharged through a pipe 12 into a receiver 13 wherein such compressed air is stored prior to its use for actuating tools or other machinery (not shown).

The motor-compressor unit shown is equipped with a preferred form of the load control device which comprises, in general, a regulator 14 which is actuated in response to variations in discharge pressure of the compressor to control the speed of the motor 11, and hence the output of the compressor 10, in accordance with such variations in discharge pressure. Associated with the regulator 14 and cooperating therewith is a valve actuating means, or mechanism, 15 and a speed governor 16 for controlling, respectively, the rate of flow of air into the compressor 10 and the speed of the motor 11.

The speed governor 16 is of a conventional type and is adapted to maintain the speed of the motor 11 relatively constant at the speed value set by the regulator. The speed governor 16 serves also as a safety device to prevent over-speeding of the motor 11 in the event the regulator 14 should, for any reason, fail to operate.

The mechanism 15 is actuated in response to variations in discharge pressure of the compressor for actuating a valve 17 positioned in the intake pipe 18 of the compressor. In the preferred form of the invention, the regulator 14 acts throughout the entire load range of the compressor to control the speed of the motor 11, whereas the mechanism 15 acts over only a portion of the load range of the compressor to control the output thereof, and more particularly, during the lower portion of this load range.

With this arrangement then, the regulator 14 will act in response to variations in discharge pressure of the compressor 10 over a predetermined pressure range to change the speed of the motor 11, and hence vary the output of the compressor 10 in accordance with such variations in pressure. The mechanism 15, on the other hand, operates over a pressure range having the same upper limiting pressure value as the aforesaid range, but having a lower limiting pressure value intermediate the limits of the range over which the regulator 14 acts. Hence the mechanism 15 comes into operation during the lower portion of the compressor load range to decrease the output of the compressor 10 by throttling the intake thereof; and if the discharge pressure rises to the upper limiting value of said pressure ranges, the compressor 10 will be completely unloaded by the simultaneous action of speed control by the regulator 14 and intake throttle control as accomplished by the mechanism 15.

Referring in greater detail to the construction of the load control device, the regulator 14 (see Fig. 3) comprises a central tubular shaped member 20 and a pair of end members 21 and 22 secured to the opposite ends of the member 20. Defined within one end portion of the member 20 is a pressure chamber 23 at one end of which is bounded by a partition 24 across the bore of the member 20, and the other end of the chamber 23 is enclosed by a diaphragm 25 the marginal portions of which are clamped between the members 20 and 21.

Pressure fluid is supplied to the pressure chamber 23 from the receiver 13 by means of a pipe 26 connected therebetween. Such pressure fluid then passes from the pressure chamber 23 into a control chamber 27 located within the member 20 on the side of the partition 24 opposite the chamber 23. The flow of pressure fluid between these two chambers is controlled by a needle valve 28 which is secured to the diaphragm 25 and actuated in accordance with variations in pressure in the chamber 23. A bushing 30 threaded in an opening 29 in the partition 24 provides a valve seat 31 for the valve 28. The force exerted on the diaphragm 25 by fluid in the chamber 23 is opposed by a spring 33 biased between the upper surface of the diaphragm 25 and a washer 34 on the end of a bolt 35 threaded in the outer, or free, end of the end member 21.

By virtue of this arrangement whenever the pressure within the chamber 23 exceeds some predetermined value, the diaphragm 25 is forced upwardly compressing the spring 33 and thereby moving the valve 28 off of its seat 31. As the diaphragm 25 is moved upwardly the effective flow area through the opening 29, communicating the chambers 23 and 27, is increased due to the needle-shaped portion of the valve 28. This increase in flow between the chambers 23 and 27 increases the pressure within the chamber 27—in a manner to be explained in greater detail hereinafter—and this increase in pressure is utilized to effect a reduction in speed of the motor 11.

In furtherance of this end, a diaphragm 36 is clamped at its marginal portions between the adjacent ends of the members 20 and 22. The diaphragm 36 is actuated in response to variations in pressure within the chamber 27 to actuate linkage 37 which in turn controls the setting of a valve 38 in the intake pipe 39 of the intake manifold 40 of the motor 11. More particularly this linkage comprises a bell crank 41 pivoted at its angle on the end member 22 and having an arm 42 extending parallel to and along the lower surface of the diaphragm 36. At the end of this arm 42 is a plate portion or piston 43 which extends through an opening 44 in the member 22 and into face contact with the lower surface of the diaphragm 36. Bearing against the opposite face of the plate portion 43 is a spring 45 the opposite end of which bears against a nut 46 threaded on a bolt 47.

The other arm 48 of the crank 41 is pivotally connected to a rod 49 which is similarly connected at its opposite end to an intermediate portion of a lever 50. The lever 50 is in turn, pivoted at its lower end on the casing 51 for the governor 16, and the upper, or free, end of this lever 50 is connected to the valve 38 by a link 52.

With this arrangement then, whenever the pressure within the chamber 27 increases above some fixed value, due to an increase in pressure in the chamber 23, the diaphragm 36 moving under the force of this increased pressure rotates the crank 41 in a counterclockwise direction and this movement is transmitted through the rod 49 and the lever 50 to the link 52 which moves the valve 38 to decrease the speed of the motor 11. A decrease in pressure in the chamber 27 will, of course, result in rotation of the crank 41 in the opposite, or clockwise direction, thereby increasing the speed of the motor 11.

As was previously mentioned, a speed governor 16 is provided which acts in cooperation with the regulator 14 to control the speed of the motor 11. The conventional governor shown by way of illustration comprising a pair of flyweights 53 hinged at their ends on a gear 54 mounted on a stub shaft 55 and driven by a gear 56 keyed to the shaft 57 of the motor 11. Movement of the flyweights in the outwardly direction under centrifugal force and in response to an increase in speed of the motor 11 results in the longitudinal movement of a sleeve 58 slidably on the shaft 55. This longitudinal movement of the sleeve 58 rotates a lever 59 keyed to a rod 60 which extends through the governor casing 51, and keyed to the other end of this rod is the lower end of the lever 50 for actuating the motor intake valve 39.

The speed governor 16 connected in this manner in the linkage 37 serves to maintain the speed of the motor 11 at a relatively constant value. The motor speed value which the governor 16 acts to maintain relatively constant is, of course, varied throughout the entire operating speed range of the motor 11 by the action of the regulator 14 in the manner previously discussed. That is, the regulator 14 acting in response to a change in compressor discharge pressure will change the speed of the motor 11 and the motor will continue to operate at the new speed value. If, however, the speed of the motor should vary, for any reason other than a variation in speed resulting from the action of the regulator 14, the speed governor 16 will act in response to this change in speed to compress the spring 45, or permit the spring 45 to expand depending upon whether the motor 11 is tending to overspeed or underspeed, and move the link 52 to position the throttle valve 39 for returning the speed of the motor 11 to the value determined by the regulator 14.

Acting in cooperation with the speed regulator 14 is the compressor inlet throttle valve 17 and the associated actuated mechanism 15 whereby the rate of flow of fluid through the compressor 10 is controlled over a portion of the load range of the compressor. In the form of the invention illustrated, the valve 17 is housed in a valve casing 61 interposed in and forming a part of the compressor inlet 18. In its preferred form, the valve 17 comprises an annular member 117 positioned to overlie a ring shaped opening 63 formed between the boundary of an opening in a transverse partition 64 within the casing 61 and the edge of an external flange 65 on a guide piece 66 integral with the casing 61.

A ring of seating material 67 is mounted on the face of the member 117 and seats against the material forming the boundaries of the opening 63 whenever the valve 17 is in its closed position. Secured to the outer surface of the seating ring 67 is a second ring 68 of somewhat smaller width—i. e., the ring 68 has a smaller outside diameter and greater inside diameter than the ring 67, and of substantially the same width as the width of the opening 63 so that the ring 68 fits in the opening 63 whenever the valve 17 is in the closed position. These rings 67 and 68 are secured to the member 117 by means of bolts 69 threaded in member 117 and a U shaped member 62 integral therewith.

Extending perpendicularly from the bottom of the U shaped member 62 and slidably in a sleeve 70 mounted in the guide 66 is a valve stem 71 for the valve 17. A spring 72 encircling the free end portion of the stem 71 is biased between an introverted shoulder 73 on the guide 66 and a nut 74 threaded on the end of the stem 71. The spring 72 positioned in this manner constantly urges the valve 17 toward the closed position and serves to close the valve whenever the compressor is shut down. The spring 72 is preferably very light so that the force or impact of fluid flowing at a relatively low rate through the opening 63 is sufficient to hold the valve 17 in the open position.

The valve actuated mechanism 15 for moving the valve 17 to throttle the flow of air into the compressor comprises, in the simple form illustrated, a tubular casing 75 mounted on the side of the valve housing 61 with its central axis arranged coaxially with respect to the central axis of the valve stem 71. A diaphragm 76 encloses the outer end of the casing 75 and cooperates with a transverse member 77 across the bore of the casing 75 to form a pressure chamber 78.

A plunger 79 actuated by the diaphragm 76 for positioning the valve 17 is secured to the diaphragm 76 by means of bolts 80 which extend through the marginal portions of a plate 81 positioned on one side of the diaphragm 76 and threaded in a flange 82 on the plunger 79 located on the other side of the diaphragm 76. The free end of the plunger extends slidably through an opening 83 in the transverse member 77 and abuts the valve 17. Hence, any longitudinal movement of the diaphragm 76 in the direction of the valve 17 serves to move the valve 17 to throttle or cut off the flow of air through the compressor 10.

The diaphragm 76 is actuated in response to variations in discharge pressure of the compressor, and in furtherance to this end a cap 84 is secured to the outer, or free end, of the casing member 75 and cooperates with the diaphragm 76 to define a pressure chamber 85. This latter chamber 85 is communicated with the control chamber 27 in the regulator 14 by means of a pipe 185. In order to obtain an amplified pressure change in the chamber 27 in accordance with pressure changes in the chamber 23, a small orifice 87 is provided in the plate 81 which communicates the chamber 85 with the interior of the casing 61 through a passage 86 formed in the diaphragm 76 and the plunger 79.

By virtue of this arrangement the pressure value of fluid in the chamber 27, and hence the chamber 85, is dependent on the difference in flow area of the opening 29 controlled by the valve 28 and that of the orifice 87 and the pressure differential existing across these openings. A slight pressure change in the chamber 23 is reflected as a considerably larger pressure change in the chamber 27 thereby making the control device, as a whole, a relatively sensitive unit capable of immediate response to slight variations in the compressor discharge pressure for varying the output of the compressor 10.

In accordance with one of the objects of the invention, the mechanism 15 is so designed that it comes into operation only during the lower portion of the load control range. Accordingly, a constant force is exerted on the diaphragm 76 in a direction opposite to that exerted on the diaphragm by pressure fluid in the chamber 85. In the preferred form of the invention, this force is exerted by pressure fluid conducted to the chamber 78 from the receiver 13 by conduit 88. In order to maintain the value of the pressure within this chamber 78 at a relatively constant value, and also to permit manual control of this pressure so as to permit adjustment of the load demand at which the mechanism 15 comes into operation, a reducing valve 90 is interposed in the conduit 88.

The reducing valve 90, shown by way of example, is best seen in Fig. 4 and comprises a casing 91 defining a valve chamber 92 into which extends a member 93 having a passage 94 therein in communication with the conduit 88. This passage 94 is communicated with the chamber 92 through an opening 95 the flow through which is controlled by a ball valve 96. The valve 96 is mounted on a piston 97 slidable in a bushing 98 threaded in the lower end, as viewed in Fig. 4, of the casing 91. A spring 99 interposed between the end of the piston 97 and an inner end surface of the bushing 98 urges the ball valve 96 against its seat 100 encircling the opening 95 for preventing the flow of pressure fluid from the receiver 13 through the passage 94 and into the chamber 92 whenever the pressure in the receiver is below some predetermined value. Whenever the pressure exceeds said predetermined value the spring 99 is compressed to permit pressure fluid to flow into the chamber 92 and thence into the conduit 88 whereby it is conducted to the chamber 78.

In order to preclude the possibility of fluctuations in pressure in the chamber 92, a second valve 101 is provided in the casing 91. This valve is mounted on the member 93 and serves to control the flow of pressure fluid from the chamber 92 through a central opening 102 in a member 103 extending through and secured to a diaphragm 104. The diaphragm 104 encloses one end of the chamber 92 and is clamped at its marginal portions between the adjacent ends of the casing 91 and a cap 106. Positioned within the cap, which is vented to the atmosphere through a hole 107, is a spring 108 biased between the diaphragm 104 and a washer 109 secured to the end of the bolt 110 threaded in the free end of the cap 106. Whenever the pressure within the chamber 92 exceeds some predetermined value, the diaphragm 104 moves the member 103 in a direction to unseat the member 103 from the ball 101 and thereby permit pressure fluid to be exhausted from the chamber 92 at a rate which maintains the pressure within the chamber 92 at the aforesaid predetermined value.

Reviewing the operation of the control device, it will be assumed that the compressor 10 is operating at its maximum speed, say for example 1800 revolutions per minute (R. P. M.), and that the discharge pressure is 100 pounds per square inch (p. s. i.). Under these conditions the needle valve 28 will rest on its seat 31 and the pressure in the chamber 23 will be 100 p. s. i., and in chambers 27 and 85 the pressure will be atmospheric. It will also be assumed that the reducing valve 90 is set so that pressure fluid at 20 p. s. i. is supplied to the chamber 78. This means, of course, that the plunger 79 will be held in its extreme right-hand position, as illustrated in Fig. 2, by the force of pressure fluid in the chamber 78 acting on the diaphragm 76, and that the valve 17 will be held in full open position by the flow of gas through the inlet 18.

In the event that the pressure within the receiver 13 should rise to a value above 100 p. s. i., pressure fluid in chamber 23 acting against the diaphragm 25 will compress the spring 33 to move the valve 28 off its seat 31 thereby permitting pressure fluid to flow into the chamber 27 through the conduit 89 and thence into the chamber 85. From the chamber 85 such pressure fluid is constantly bled through the orifice 87 into the intake of the compressor 10. Flow through the orifice 87 is, however, restricted so that the pressure within the chambers 27 and 85 varies in direct proportion with variations in receiver pressure. The diaphragm 36 acting in response to these variations in pressure in the chamber 27 will compress, somewhat, the spring 45 and overcome the force exerted through the flyweights 53 and actuate the linkage 37 to vary the speed of the motor 11 and hence vary the output of the compressor 10. For example, during the period when the receiver pressure varies from 100 to 103 p. s. i., the pressure in the chamber 27 will vary, approximately, from zero to 20 p. s. i. and the speed of the motor 11 will vary from 1800 to 900 R. P. M. When the pressure within the receiver reaches 103 p. s. i., the pressure within the chambers 27 and 85 (20 p. s. i.) will be equal to the pressure within the chamber 78 and, accordingly, the plunger 79 will be moved to the left, as viewed in Fig. 2, thereby actuating the valve 17 toward its closed position to decrease the rate of flow of pressure fluid through the compressor 10. Simultaneously, with this action, the speed regulator 14 acts to decrease, further, the speed of the motor 11. This dual action will continue until such time as the pressure within the chamber 85 reaches a value whereat the force exerted on the diaphragm 76 overcomes the forces tending to hold the valve 17 in the open position and closes the valve 17 thereby completely unloading the compressor 10. At this receiver pressure, 106 p. s. i., the pressure in the control chamber 27 will equal, approximately, 40 p. s. i. and the regulator will have rotated the bell crank 41 to move the linkage 37 to position the valve 39 so that the motor 11 is operating at its minimum speed of 600 R. P. M.

It is clear from the foregoing discussion that a motor-compressor unit provided with a control device constructed in accordance with the practice of this invention is capable of operating throughout its entire range in an efficient and effective manner; and that due to the dual control—speed and intake—the advantages of each method of control may be attained without the disadvantages associated with either method operating singly over the entire compressor load range. For example, if speed control alone were used to reduce the output of the compressor, it is at once clear that it would be impossible to completely unload the compressor 10 without stopping the motor 11 because the torque developed by the motor falls off more rapidly with a decrease in speed than does the load on the compressor and at a speed somewhere around 900 R. P. M. is insufficient to overcome the load on the compressor. It is at this point that the intake control comes into operation to further decrease the load on the compressor and hence prevent the driving motor from stalling.

It is also to be noted that with a regulator constructed in accordance with these specifications, that smooth control over the rate of flow of pressure fluid through the compressor and hence the load thereon is available. This means that a lower minimum speed for the motor may be utilized than would be available if step control were used—i. e., if a load were suddenly imposed upon the motor at a low speed, say 600 R. P. M., the motor would stall, on the other hand, where the load is imposed gradually, as in the present case, the motor may be operated at a relatively lower speed without encountering the danger of stalling in the event of an increased load demand.

I claim:

1. The combination with a fluid compressor driven by a motor, of a control device comprising a regulator responsive to variations in discharge pressure of the compressor over a predetermined discharge pressure range for controlling the speed of the motor, a valve for controlling the flow of fluid through the compressor, and means connected to and actuated by the regulator for actuating said valve in response to variations in discharge pressure of the compressor over a predetermined pressure range having one limit intermediate the limits of the first said range.

2. The combination with a fluid compressor driven by a motor, of a control device comprising a regulator responsive to variations in discharge pressure of the compressor above a predetermined value for varying the speed of the motor, a speed governor for maintaining the speed of the motor relatively constant at the value set by said regulator, a valve for controlling the rate of flow of gas through the compressor, and means connected to and actuated by the regulator in response to variations in discharge pressure above some predetermined value for actuating said valve, said predetermined pressure value being a somewhat higher pressure value than the first said predetermined pressure value.

3. The combination with a gas compressor driven by a motor; of a control device comprising a regulator acting responsively to variations in discharge pressure of the compressor for controlling the speed of the motor; a valve for controlling the flow of gas through the compressor; an actuator for the valve acting responsively to variations in discharge pressure of the compressor, said actuator including a member defining a compartment having an inlet and an outlet for pressure fluid, a piston to actuate the valve having a surface exposed to pressure fluid in the compartment and proportionally urged in one direction by variations in pressure therein, and means for exerting a relatively constant force on the piston in a direction opposed to the first said direction; and a regulator connected to said inlet and to the discharge of the compressor and acting responsively to variations in pressure of such discharge for varying the pressure on fluid supplied to said compartment.

4. In combination, a motor, a compressor driven by the motor, a control device comprising a valve for controlling the flow of pressure fluid through the compressor, pressure fluid actuated apparatus for actuating said valve whenever the discharge pressure of the compressor exceeds a predetermined value, said apparatus including a compartment having an inlet and outlet for the passage of pressure fluid and a member in the compartment to actuate the valve proportionately and responsively to a range of variations in the pressure of the fluid in the compartment, a motor valve for controlling the supply of power to the motor, and a regulator connected to actuate the motor valve, said regulator being subjected to discharge pressure of the compressor and actuated by a range of variations therein above a predetermined pressure value lower than the first said value to vary the motor speed, said regulator having valve apparatus for valving pressure fluid to the compartment of the valve actuating apparatus in proportion to the value of the discharge pressure of the compressor.

5. The combination with a fluid compressor and a motor for driving the compressor, of a control device comprising a valve for controlling the power supply of the motor, a valve for controlling the rate of flow of fluid through the compressor, a valve actuator arranged to operate the second said valve, means connected to the discharge of the compressor and adapted to supply pressure fluid at pressures varying proportionately with variations in the compressor discharge pressure to operate the valve actuator to close progressively the second said valve in response to progressive increases in such discharge pressure above a predetermined value, and linkage connected between said means and the first said valve and being actuated by said means to decrease the speed of the motor proportionately to increases in discharge pressure above a predetermined value less than the first said value.

6. The combination with a fluid compressor and a motor for driving the compressor, of a control device comprising a valve for controlling the power supply of the motor, a valve for controlling the rate of flow of fluid through the compressor, a valve actuator arranged to operate the second said valve, means connected to the discharge of the compressor and connected to supply pressure fluid to actuate the valve actuator, said means acting responsively to variations in the compressor pressure discharge above a predetermined value to vary the pressure of the fluid supplied to said actuator for varying accordingly the rate of flow of fluid through the compressor, linkage between said means and the first said valve, said means being arranged to actuate the linkage in response to variation in the compressor discharge pressure above a predetermined value different than the first said value to vary accordingly the supply of power to the motor.

JOHN LE VALLEY.

References Cited in the file of this patent
UNITED STATES PATENTS

| Number | Name | Date |
|---|---|---|
| 1,315,433 | Tatum | Sept. 9, 1919 |
| 1,998,265 | Aikman | Apr. 16, 1935 |
| 2,137,219 | Aikman | Nov. 22, 1938 |
| 2,166,789 | Baker | July 18, 1939 |
| 2,225,854 | Baker | Dec. 24, 1940 |
| 2,585,168 | Platts | Feb. 12, 1952 |
| 2,595,369 | Repscha et al. | May 6, 1952 |